United States Patent [19]

Oakes

[11] 4,082,993

[45] Apr. 4, 1978

[54] GAS APPLIANCE VALVE AND ADAPTOR

[75] Inventor: Malcolm Campbell Oakes, Wilmslow, England

[73] Assignee: Taymar Limited, Stockport, England

[21] Appl. No.: 691,208

[22] Filed: May 28, 1976

[30] Foreign Application Priority Data

May 30, 1975 United Kingdom ............... 23558/75

[51] Int. Cl.[2] ........................ F16L 37/28; F23D 13/04

[52] U.S. Cl. .................................... 137/322; 431/344; 126/40; 222/3; 137/269

[58] Field of Search ................ 251/149.4, 149.5, 149.6; 137/322, 318, 269; 431/344; 126/40; 222/3, 5

[56] References Cited

U.S. PATENT DOCUMENTS

| | | | |
|---|---|---|---|
| 350,897 | 10/1886 | Shaw et al. | 251/149.5 |
| 2,854,991 | 10/1958 | Webster | 137/322 |
| 3,190,496 | 6/1965 | Weiland, Jr. et al. | 222/3 |
| 3,361,298 | 1/1968 | Trumble | 222/5 |
| 3,736,093 | 5/1973 | Bowman | 431/344 X |
| 3,749,356 | 7/1973 | Conley | 222/3 X |
| 3,924,654 | 12/1975 | Buller et al. | 137/322 |

*Primary Examiner*—William R. Cline
*Attorney, Agent, or Firm*—Fleit & Jacobson

[57] ABSTRACT

There is disclosed a valve for controlling flow of gas and for use with portable gas appliances such as picnic stoves, heaters or lamps. The valve is associated with an adaptor having a projection arranged for operating an outlet valve in a refillable gas container when the adaptor is threaded on to the container. The valve body has an inlet including a pin for operating the valve of a self-sealing gas cartridge.

5 Claims, 6 Drawing Figures

GAS APPLIANCE VALVE AND ADAPTOR

BACKGROUND OF THE INVENTION

This invention relates to gas control valves for use with portable gas appliances, for example stoves of the kind used in camping or on picnics, or heaters or lamps or lanterns.

SUMMARY OF THE INVENTION

According to the invention there is provided a valve for gas comprising a valve body having an inlet and an outlet for gas flow, the inlet having internal threads and external threads, and an adaptor having threads engageable with the internal threads of the inlet and a projection extending away from the portion carrying the adaptor threads for operating an outlet valve of a refillable gas container when the external inlet threads are engaged with internal threads of an outlet of the container.

BRIEF DESCRIPTION OF THE DRAWINGS

The invention may be performed in various ways and one specific embodiment will now be described by way of example with reference to the accompanying drawings, in which.

DETAILED DESCRIPTION OF THE PREFERRED EMBODIMENT

Figure 1:
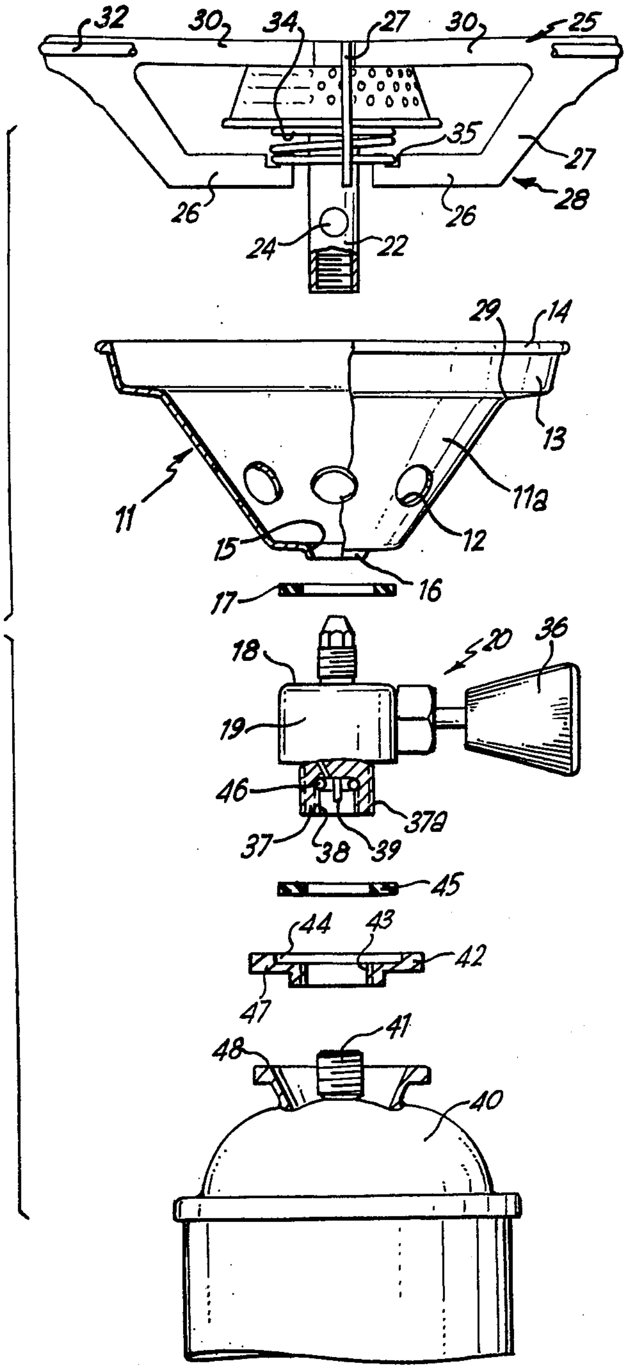
FIG. 1 is an exploded view partly in section of a burner unit.

The burner unit indicated generally at 10 is for use as a portable stove and is fuelled by gas from a puncturable gas cartridge or a gas cartridge provided with a self-sealing valve for its outlet or a refillable gas container. The refillable container has an outlet provided with a valve biassed to the closed position. Such cartridges and containers are well known in the art and need not be described further. Both the container and the self-sealing cartridge can be refilled but it is usual to dispose of the cartridges when empty.

The burner includes a windshield 11 provided with angularly spaced apertures 12 in a conical portion 11*a* for ingress of air. The windshield has an upper outwardly flanged portion 13 having a lip 14. At its lower end the windshield 11 is provided with an aperture 15 defined by an annular downward projection 16 which is embraced by a flat annular neoprene washer 17 which is held in place by a shoulder 18 on the body 19 of a gas flow control valve 20. The outlet from the valve 20 is in the form of an externally threaded projection 21 which extends through the aperture 15 and is in threaded engagement with the lower end of a stem 22 of a burner device 23. Two diametrically opposed apertures 24 are provided in the stem 22 for ingress of primary air into the gas stream through the stem 22 to the burner 23. Secondary air is supplied through apertures 12.

Figure 2:
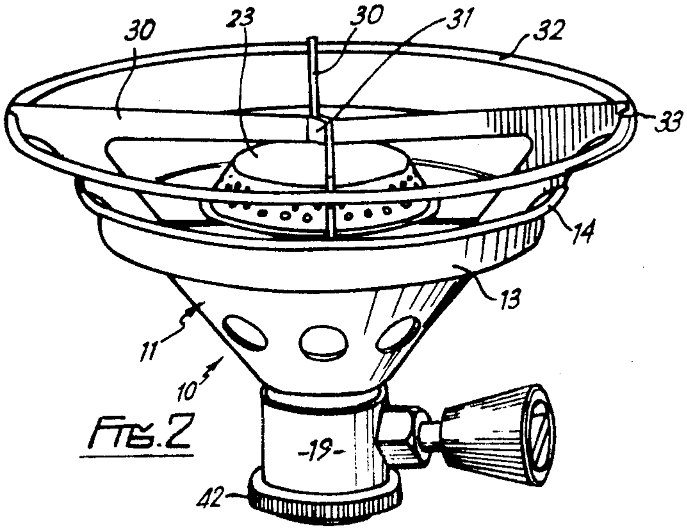
FIG. 2 is a perspective view of the assembled burner unit of FIG. 1.

A support 25 for pans or the like has four equiangularly spaced horizontally extending lower arms 26 leading to outwardly and upwardly inclined portions 27. The portions 27 in regions at 28 adjacent the outer ends of the portions 26, in the assembled condition of the unit, engage portions 29 at the inner end of the flange 13. The outer ends of the portions 27 are connected by cross portions 30 themselves welded together at a central location 31. A circular-section ring 32 is seated in spherical recesses 33 in the outer ends of the portions 30. It will be observed that the pan support 30 is suitable for both larger diameter and smaller diameter pans and provides adequate support immediately above the head 23 of the burner. This can be particularly seen in FIG. 2.

The burner 23 is biassed away from the control valve 20 by a coil spring 34 extending between the under surface of the burner head 23 and the upper edge of the portions 26 which are recessed at 35 at the upper side of their inner ends to help to locate the spring 34. When the valve 20 is disassembled from the stem 22, the spring 34 holds the burner head firmly against the cross portions 30.

The gas control valve 20 is operated by a knurled knob 36 and includes an externally threaded inlet boss 37 which is internally threaded at 38. The control valve 20 includes a downwardly extending pin 39. In the arrangement shown in FIG. 1 the stove unit is to be used with a cartridge 40 for gas under pressure which is of the kind having a built-in self-closing outlet valve. The cartridge 40 includes an outlet boss 41 which is externally threaded and which can be engaged with the threads 38. When this is done, the pin 39 operates the valve in the cartridge 40 to allow gas to flow to the burner 23 under the control of the valve 20. An externally knurled locking ring 42 is provided and is internally threaded at 43 to be engaged on the external threads 37*a* on the inlet boss 37. The ring 42 has an annular recess 44 at its upper face to receive a flat annular washer 45. After the boss 41 has been fully engaged with the threads 37*a* and been brought into sealing engagement with an 'O' ring 46, the locking ring 42 is rotated on the threads 37*a* until its end face 47 engages the outer face 48 of a skirt surrounding the boss 41. By these means the weight of the cartridge is to some degree removed from the threads 41 and transferred to the body of the cartridge acting through the ring 42 and the strong threads 43 and 37*a*.

When the valve outlet 21 is threaded into the stem 22, the head 23 is moved away from cross portions 30 against spring 34.

Figure 3:
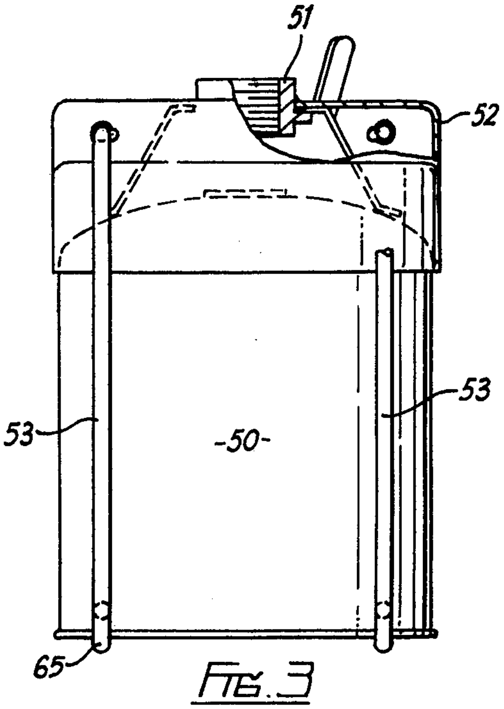
FIG. 3 is a side elevation, partly broken away and partly in section, of a gas cartridge for use with the burner unit.
Figure 4:
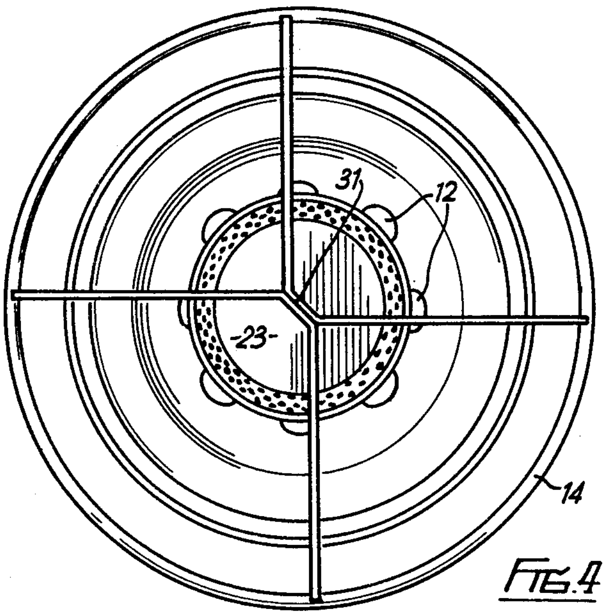
FIG. 4 is a plan view of the burner unit from above.

The burner unit may be used with a gas container which cannot be refilled after it has been initially punctured. Such an arrangement is shown in FIGS. 3 and 4 in which the container 50 has an internally threaded outlet boss 51 which can be associated with an adaptor as described in my pending U.S. Pat. Application No. 641,380. The gas control valve 20 is associated with the gas consuming appliance as described in that application. The adaptor extends through the boss 51 which is held in a housing 52 to which are pivoted two U-section members 53 which can engage beneath the base of the container 50.

Figure 5:
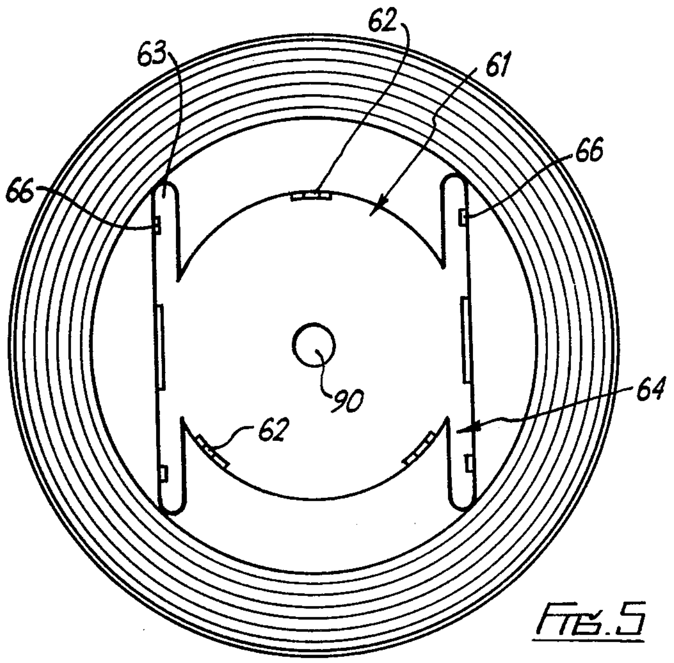
FIG. 5 is a plan view from above of a support.

A base support shown in FIG. 5 is supplied for use with either the cartridge 40 or the container 50. The support 60 is of moulded plastics and in its upper surface includes a recess 61 for receiving the base of the cartridge 40. A number of small inward projections 62 enable the cartridge 40 to be received in the recess with a snap action. Also extending from the recess are four elongated recesses 63 generally forming two elongated recesses which can receive the portions 65 of the U-shaped members 53 which lie beneath the container 50. Again small projections 66 are provided so that the U-shaped members can be located in the elongated recesses with a snap action due to the inherent resilience of the projections 62 and 66.

The underface of the support may be shaped to accommodate a pricker and a spanner, the pricker for use in cleaning any obstacle in the gas flow bore in outlet 21 and the spanner for use as described later.

It will be appreciated that the ring 32 assists in preventing a pan or the like, or a can, from undesirably toppling off the pan support for example whilst being placed on to the stove. This is particularly important in the case of pans with heavy handles which tend to overbalance the pan. It will also be appreciated that the effect of the spring 34 is to hold the pan support 30 firmly against movement relative to the burner and the windshield. The windshield acts as a spacer.

Figure 6:
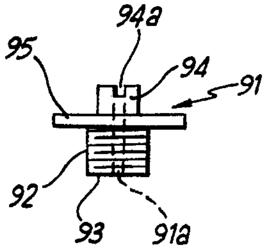
FIG. 6 is a side view of an adaptor part.

A central aperture 90 in the base support 60 threadedly detachably houses a small brass adaptor 91 FIG. 6, having a through bore 91*a*. This enables the gas control valve and burner to be used with refillable gas containers of the kind which have a valve-controlled outlet. In this case the ring 42 is removed and an externally threaded portion 92 of the adaptor is engaged with the internal thread 38 until end 93 of the threaded portion seals against the 'O' ring 46. A projection 94 having a diametral screw slot 94*a* extends into the outlet of the gas container to open the valve and the sealing washer 45 seals against the container and against valve body 19. The flange 95 of the adaptor seals against a rubber ring in the outlet of the container.

If the locking ring is removed, it may be releasably stored in the base support by a snap-in flat spanner.

I claim:

1. An adaptor in combination with a control valve of the type having a pin for cooperating with a self-sealing outlet valve in a gas container having an externally threaded connection for adapting the control valve for use with a refillable gas container having an internally threaded connection, the combination comprising a body having a through passage with an inlet portion and an outlet portion for gas flow therethrough, valve means located in said body operative to open and close said through passage, the inlet portion of the valve body being in the form of a boss having internal and external threads concentrically surrounding said pin, and an adaptor element having an axial bore therethrough and an externally threaded portion engageable with the internal threads of said inlet portion and having a projection extending away from said externally threaded portion of said adaptor element for operating a self-sealing outlet valve of the refillable gas container having an internally threaded connection when the external inlet threads on the valve body are engaged with said internal threads of the connection of the gas container.

2. A valve and adaptor as claimed in claim 1, in which the projection has a screw slot in its outer end.

3. A valve and adaptor as claimed in claim 1, including a locking ring in threaded engagement with the external threads of the inlet portion so that when the internal inlet threads are engaged with the container or cartridge external outlet threads or with external threads on an adaptor connected to said cartridge the locking ring can be rotated to engage the container or cartridge or adaptor and relieve the load on the engaged inlet threads.

4. A valve and adaptor as claimed in claim 3, in which one face of the ring is recessed to accommodate a sealing washer for engaging the valve body.

5. A valve and adaptor in combination as claimed in claim 1, wherein the diameter of said axial bore is substantially larger than the diameter of said pin.

* * * * *